United States Patent
Nakatsu

(10) Patent No.: US 9,335,960 B2
(45) Date of Patent: May 10, 2016

(54) IMAGE FORMING SYSTEM THAT ENSURES PREVIEW DISPLAY BY USE OF PORTABLE TERMINAL OF USER AND INFORMATION PROCESSING TERMINAL

(71) Applicant: KYOCERA Document Solutions Inc., Osaka (JP)

(72) Inventor: Kenta Nakatsu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/839,768

(22) Filed: Aug. 28, 2015

(65) Prior Publication Data

US 2016/0098237 A1     Apr. 7, 2016

(30) Foreign Application Priority Data

Oct. 3, 2014    (JP) ................................. 2014-204388

(51) Int. Cl.
| | |
|---|---|
| *G06F 15/00* | (2006.01) |
| *G06F 3/12* | (2006.01) |
| *H04N 1/00* | (2006.01) |

(52) U.S. Cl.
CPC ............ *G06F 3/1256* (2013.01); *G06F 3/1208* (2013.01); *G06F 3/1292* (2013.01); *H04N 1/0044* (2013.01); *H04N 1/00204* (2013.01); *H04N 2201/0074* (2013.01); *H04N 2201/0094* (2013.01)

(58) Field of Classification Search
USPC ........................................................ 358/1.15
See application file for complete search history.

(56) References Cited

U.S. PATENT DOCUMENTS

| | | | | |
|---|---|---|---|---|
| 7,264,164 | B2 * | 9/2007 | Sakai ..................... | G06K 1/121 |
| | | | | 235/454 |
| 7,535,591 | B2 * | 5/2009 | Kujirai .................. | G06F 3/1205 |
| | | | | 358/1.1 |
| 8,994,975 | B2 * | 3/2015 | Ono ....................... | G06F 3/1211 |
| | | | | 358/1.13 |
| 2013/0235422 | A1 | 9/2013 | Nakata ........................ | 358/1.15 |

FOREIGN PATENT DOCUMENTS

| | | |
|---|---|---|
| JP | 2013-109737 A | 6/2013 |
| JP | 2013-186824 A | 9/2013 |
| JP | 2013-196552 A | 9/2013 |

* cited by examiner

*Primary Examiner* — Allen H Nguyen
(74) *Attorney, Agent, or Firm* — Stein IP, LLC

(57) ABSTRACT

An image forming system includes a portable terminal, an information processing terminal, and an image forming apparatus. The portable terminal has an imaging function. The information processing terminal generates print data. The image forming apparatus generates a printed matter based on the print data received from the information processing terminal. The portable terminal includes an imaging unit, an information acquiring unit, a preview image generating unit, and a display unit. The imaging unit images the preview-display code displayed in the display unit of the information processing terminal. The information acquiring unit acquires information necessary for the preview display based on the preview-display code acquired by the imaging unit. The preview image generating unit generates a preview image of the printed matter according to the information acquired by the information acquiring unit. The display unit displays the preview image generated by the preview image generating unit.

6 Claims, 8 Drawing Sheets

IMAGE FORMING SYSTEM THAT ENSURES PREVIEW DISPLAY BY USE OF PORTABLE TERMINAL OF USER AND INFORMATION PROCESSING TERMINAL

INCORPORATION BY REFERENCE

This application is based upon, and claims the benefit of priority from, corresponding Japanese Patent Application No. 2014-204388 filed in the Japan Patent Office on Oct. 3, 2014, the entire contents of which are incorporated herein by reference.

BACKGROUND

Unless otherwise indicated herein, the description in this section is not prior art to the claims in this application and is not admitted to be prior art by inclusion in this section.

Recently, an image forming apparatus such as a facsimile, a printer, or a copier has been widely used in offices and similar place. The image forming apparatus is in many cases used, for example, in a state where the image forming apparatus is connected to an information processing terminal, such as a personal computer, via a network such as a Local Area Network (LAN).

when print data (print job) is transmitted to the image forming apparatus from the information processing terminal, there is widely employed a configuration that can verify whether or not a desired printing result can be acquired by displaying a preview image in the information processing terminal.

For example, there is disclosed a technique related to a printing process system performing preview display of a print image before a print job at a client terminal including a portable terminal.

There is disclosed another technique related to a printing system causing job information spooled with respect to a printer with low display capability in a client PC to display on a smart phone which a user keeps. This technique can accept a job selection or a print setting change of a print target by a user with a smart phone.

Furthermore, there is disclosed yet an image forming apparatus that specifies a display direction and a scale of a print preview image such that a display area of the print preview image occupies maximum proportion in the preview area, based on a size and shape of a preview area displaying the print preview image, a display size and a shape of the print preview image, and print setting information. This configuration is described that it can appropriately display a preview image even when an information processing terminal is a portable terminal having a small-sized display.

SUMMARY

An image forming system according to one aspect of the disclosure includes a portable terminal, an information processing terminal, and an image forming apparatus. The portable terminal has an imaging function. The information processing terminal generates print data. The image forming apparatus generates a printed matter based on the print data received from the information processing terminal. The information processing terminal includes: a print condition accepting unit, a preview-code generating unit, a display unit, a print-data generating unit, and a transmitting unit. The print condition accepting unit accepts an input of a print condition. The preview-code generating unit codes information necessary for a preview display of the printed matter according to the print condition accepted by the print condition accepting unit as a preview-display code when a preview display instruction is inputted in the portable terminal. The display unit displays the preview-display code generated by the preview-code generating unit. The print-data generating unit generates the print data according to the print condition accepted by the print condition accepting unit when a print execution instruction is inputted. The transmitting unit transmits the print data generated by the print-data generating unit to the image forming apparatus. The portable terminal includes an imaging unit, an information acquiring unit, a preview image generating unit, and a display unit. The imaging unit images the preview-display code displayed in the display unit of the information processing terminal. The information acquiring unit acquires information necessary for the preview display based on the preview-display code acquired by the imaging unit. The preview image generating unit generates a preview image of the printed matter according to the information acquired by the information acquiring unit. The display unit displays the preview image generated by the preview image generating unit. The image forming apparatus includes a receiving unit and an image forming unit. The receiving unit receives the print data transmitted by the transmitting unit of the information processing terminal. The image forming unit prints the print data received by the receiving unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
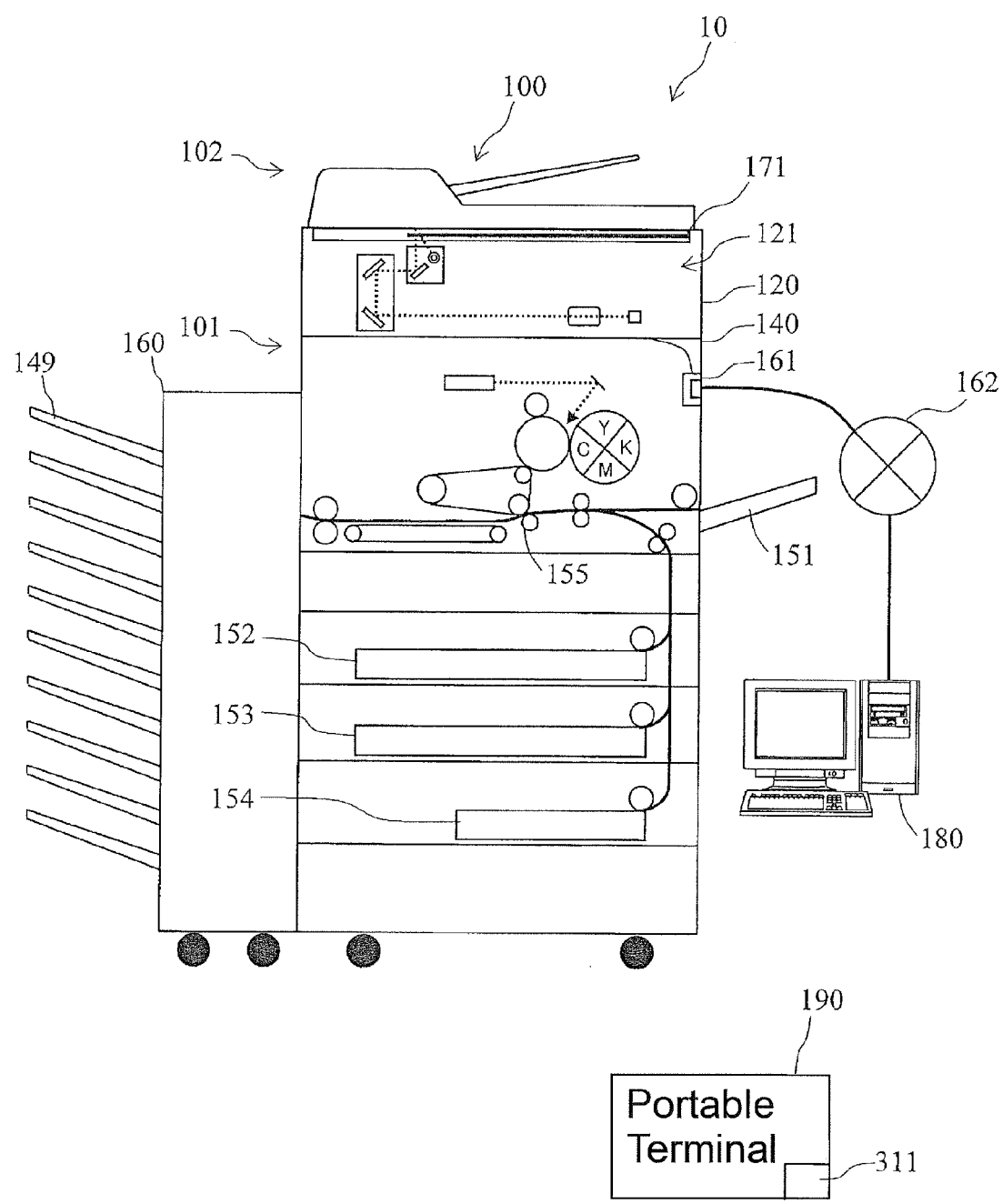
FIG. 1 illustrates an overall configuration of an image forming system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure in more detail with reference to the drawings. In the following, the disclosure is embodied as an image forming system that includes an image forming apparatus including a digital multi-functional peripheral, an information processing terminal including a personal computer, and a portable terminal including a smart phone and a tablet terminal.

FIG. 1 illustrates an exemplary overall configuration of the image forming system in the embodiment. As illustrated in FIG. 1, an image forming system 10 includes a multi-functional peripheral 100, an information processing terminal 180 and a portable terminal 190.

The multi-functional peripheral 100 includes a main body 101 including an image reading unit 120 and an image forming unit 140, a platen cover 102 mounted over the main body 101. In a front face of the multi-functional peripheral 100 is located an operation panel 171 where a user can provide instructions of a start of copying and other instructions to the multi-functional peripheral 100 and verify a state and a setting of the multi-functional peripheral 100.

In the upper portion of the main body 101, the image reading unit 120 is located. The image reading unit 120 reads an image of a document by a scanning optical system 121 and generates digital data (image data) of the image.

The generated image data can be printed on a paper sheet in the image forming unit 140. The generated image data can be also transmitted to other devices via a network via a network interface 161 or similar interface.

The image forming unit 140 prints the image data generated by the image reading unit 120 and the image data received from other device connected to a network 162 on the paper sheet. In FIG. 1, only the information processing terminal 180 is exemplified as the other device.

The image forming unit 140 feeds a paper sheet to a transfer unit 155 transferring a toner image from a manual bypass tray 151, sheet feed cassettes 152, 153, 154 and similar tray. The paper sheet, where the toner image is transferred in the transfer unit 155, is conveyed to a finisher 160. The finisher 160 is an optional device performing after-treatment such as punch processing, staple processing, folding processing, binding processing, and similar processing. When after-treatment is specified as a print condition, the paper sheet, where the after-treatment is performed, is discharged to a sheet discharge tray 149. When after-treatment is not specified as a print condition, the paper sheet having passed the finisher 160, without the after-treatment being performed, is discharged to the sheet discharge tray 149. In FIG. 1, an illustration of an internal structure of the finisher 160 is omitted.

The portable terminal 190 includes an imaging unit 311. As described in detail in the following, the portable terminal 190 acquires a print condition of print data generated in the information processing terminal 180 by imaging a preview code displayed in a display unit of the information processing terminal 180 with the imaging unit 311.

Figure 2:
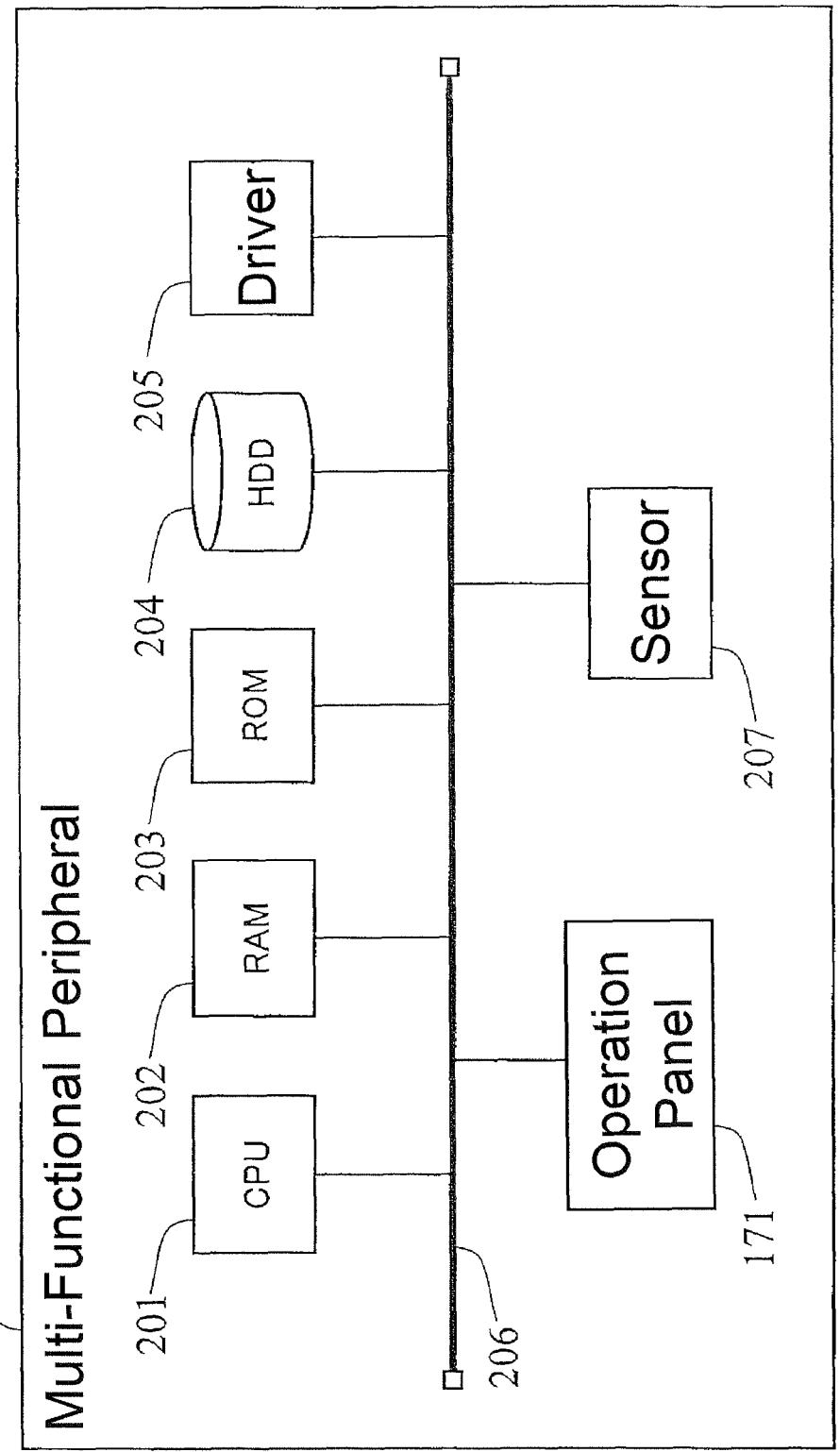
FIG. 2 illustrates a hardware configuration of a multifunctional peripheral according to the one embodiment.

FIG. 2 illustrates a hardware configuration of a control system in the multi-functional peripheral 100. In the multi-functional peripheral 100 in the embodiment, a Central Processing Unit (CPU) 201, a Random Access Memory (RAM) 202, a Read Only Memory (ROM) 203, a Hard Disk Drive (HDD) 204, and a driver 205 corresponding to respective driving units in the image reading unit 120, the image forming unit 140, and the finisher 160 are connected via an internal bus 206. The ROM 203, HDD 204, and similar memory stores programs, and the CPU 201 controls the multi-functional peripheral 100 in accordance with instructions of the control programs. For example, the CPU 201, which uses the RAM 202 as a work area, controls operations of the above-described respective driving units by transmission and reception of data and instructions with the driver 205. The HDD 204 is also used to accumulate the image data acquired by the image reading unit 120 and the image data received from the other devices via the network 162.

To the internal bus 206, the operation panel 171 and various kinds of sensors 207 are also connected. The operation panel 171 accepts an operation by a user and supplies a signal based on the operation to the CPU 201. The operation panel 171 displays an operation screen in its display in accordance with a control signal from the CPU 201. The sensors 207 includes various kinds of sensors, such as an open and close detection sensor of the platen cover 102, a document detection sensor on a platen, a temperature sensor of a fuser, a detection sensor for a conveyed paper sheet or a document and similar sensor.

The CPU 201 ensures respective units (function blocks) in the following and controls the operations of the respective units corresponding to the signals from these sensors by executing the programs stored, for example, in the ROM 203.

Figure 3:
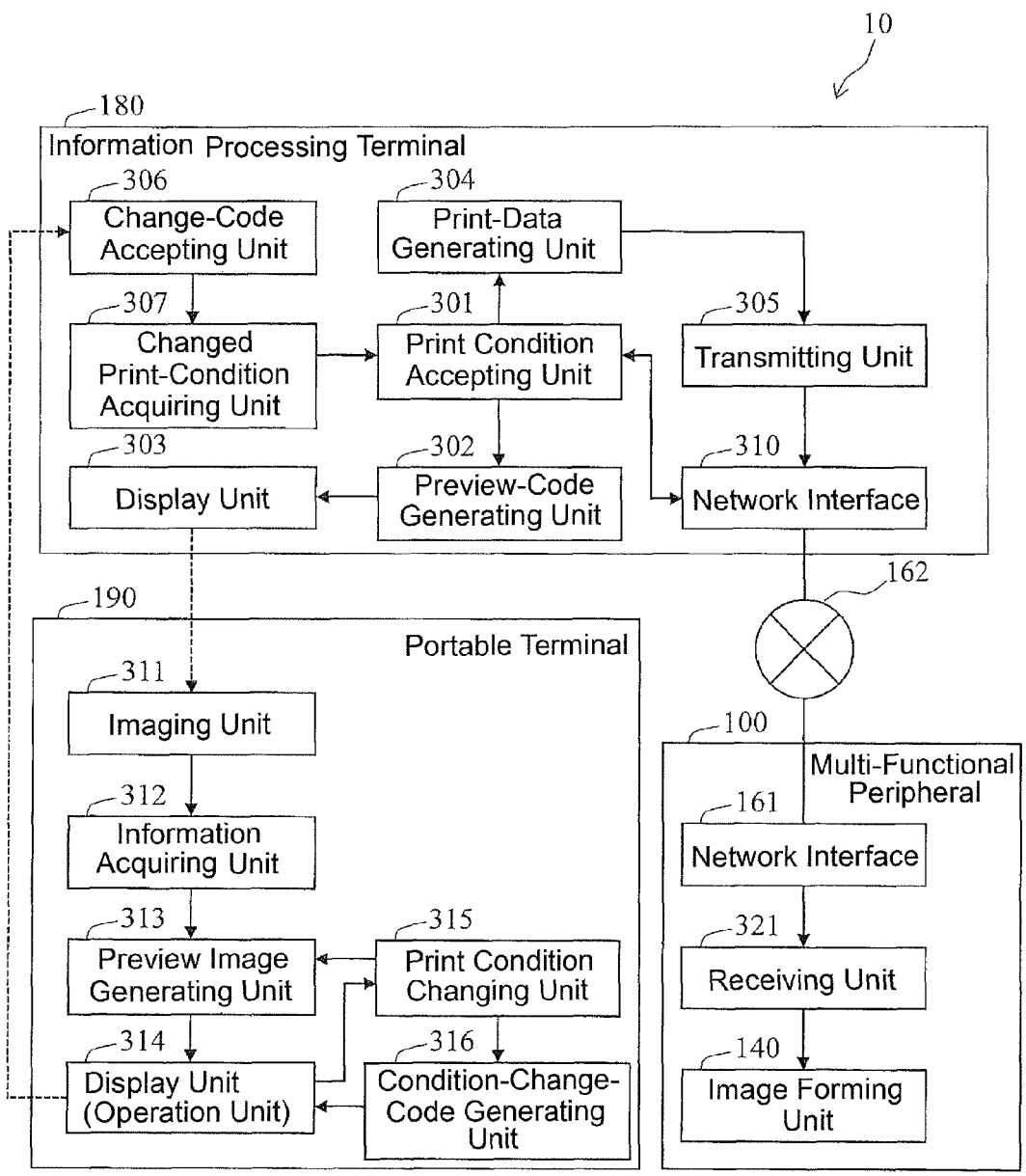
FIG. 3 illustrates the image forming system according to the one embodiment.

FIG. 3 illustrates the image forming system of the embodiment. As illustrated in FIG. 3, the image forming system 10 in the embodiment includes the information processing terminal 180, the portable terminal 190, and the multi-functional peripheral 100. The multi-functional peripheral 100 and the information processing terminal 180 are connected via the network 162 in a state where reception and transmission of data is ensured. The portable terminal 190 is not connected to the network 162 where the multi-functional peripheral 100 and the information processing terminal 180 are connected, and cannot communicate with the multi-functional peripheral 100 and the information processing terminal 180. However, the portable terminal 190 can communicate by connection to the Internet via a public communication line or similar communication line.

The information processing terminal 180 is constituted of a personal computer and connected to the network 162 via a network interface 310. Further, the information processing terminal 180 includes a print condition accepting unit 301, a preview-code generating unit 302, a display unit 303, a print-data generating unit 304 and a transmitting unit 305.

The print condition accepting unit 301 accepts an input of a print condition. A user inputs the print condition via an input unit, for example, such as a keyboard, a mouse or similar unit included in the information processing terminal 180. The print condition accepting unit 301 is, for example, an input interface of a printer driver operating on the information processing terminal 180, and a set value of respective setting items configuring the print condition for generation of the print data transmitted to the multi-functional peripheral 100 and various kinds of instructions relative to the printer driver are inputted. The print condition accepting unit 301 verifies a state of the multi-functional peripheral 100 at activation. In this verification, the print condition accepting unit 301 acquires information of whether or not the multi-functional peripheral 100 is usable and presence or absence of the optional device mounted to the multi-functional peripheral 100, and similar information from the multi-functional peripheral 100. Then, the print condition accepting unit 301 recognizes the setting items configurable as the print condition.

When an preview display instruction in the portable terminal 190 is inputted, the preview-code generating unit 302 codes information, which is necessary to perform a preview display of a printed matter according to the print condition (the print condition accepted by the print condition accepting unit 301) at the time, as the preview-display code. In the embodiment, the preview display instruction in the portable terminal 190 is accepted by the print condition accepting unit 301.

The information necessary to perform the preview display of the printed matter in the portable terminal 190 can be appropriately selected corresponding to an aspect of the preview display in the portable terminal 190. For example, other than the information: the information identifying the model of the multi-functional peripheral 100, the information identifying the model of the optional device (here, finisher 160) mounted to the multi-functional peripheral 100, the version information of the printer driver operating on the information processing terminal 180 and similar information, the set values of the print condition, such as the information identifying an amount of overall printed matter such as a count of pages and the information identifying a process in the finisher 160, can be included.

Though it is not specifically limited, in the embodiment, a two-dimensional code exemplified in a QR code (registered trademark) is employed as the preview-display code. This two-dimensional code is, as described below, acquired by a user desiring the preview display in the portable terminal 190 into the portable terminal 190 which the user keeps.

The display unit 303 displays the preview-display code generated by the preview-code generating unit 302. For example, the display of the information processing terminal 180 corresponds to this display unit 303.

When a print execution instruction is inputted, the print-data generating unit 304 generates the print data corresponding to the print condition accepted by the print condition accepting unit 301. The print-data generating unit 304 is, for example, a main body of the printer driver operating on the information processing terminal 180, and the print-data generating unit 304 converts document image data created by various applications, such as word processor software executed in the information processing terminal 180, a spreadsheet program, and figure drawing software, to the print data described by predetermined Page Description Language (PDL) or similar language in accordance with the set print condition.

In the embodiment, a print execution instruction is accepted by the print condition accepting unit 301.

The transmitting unit 305 transmits the print data generated by the print-data generating unit 304 to the multi-functional peripheral 100 via the network interface 310 and the network 162.

In the embodiment, the information processing terminal 180 further includes a change-code accepting unit 306 and a changed print-condition acquiring unit 307.

The change-code accepting unit 306 accepts an input of a print-condition-change code described below, which is generated by the portable terminal 190. For example, when a user input a input screen display instruction of a print-condition-change code via the input unit included in the information processing terminal 180, such as the keyboard or the mouse, the change-code accepting unit 306 displays a input screen in the display unit 303. The user can input the print-condition-change code via this input screen.

The changed print-condition acquiring unit 307 acquires a print condition from the print-condition-change code accepted by the change-code accepting unit 306 and input the print condition to the print condition accepting unit 301. As described below, in the embodiment, the print-condition-change code is a character string code. In the embodiment, the changed print-condition acquiring unit 307 acquires a new print condition by decoding of the character string code.

The information processing terminal 180 includes a CPU, a RAM, a ROM and a HDD, similar to the multi-functional peripheral 100. The CPU, for example, by executing programs stored in the ROM or HDD with the RAM as a work area, ensures the print condition accepting unit 301, the preview-code generating unit 302, the print-data generating unit 304, the transmitting unit 305, the change-code accepting unit 306, and the changed print-condition acquiring unit 307. An area, where the print-data generating unit 304 and similar unit hold data, can use, for example, the RAM or the HDD.

On the other hand, the portable terminal 190 includes the imaging unit 311, an information acquiring unit 312, a preview image generating unit 313 and a display unit 314.

The imaging unit 311 images the preview-display code displayed on the display unit 303 of the information processing terminal 180. The imaging unit 311 includes an imaging device such as a Charge Coupled Device (CCD) image sensor, a Complementary Metal Oxide Semiconductor (CMOS) image sensor or similar image sensor and acquires the imaged preview-display code as image data.

The information acquiring unit 312 acquires information necessary to perform the preview display based on the preview-display code acquired by the imaging unit 311. As described above, in the embodiment, the preview-display code is the two-dimensional code. In the embodiment, the information acquiring unit 312 acquires information necessary to perform the preview display by decoding of the two-dimensional code.

The preview image generating unit 313 generates the preview image of the printed matter according to the information acquired by the information acquiring unit 312. In the embodiment, the image data itself printed in the multi-functional peripheral 100 is not included in the preview-display code. That is, in the preview-display code, only the information relate to a layout of the printed matter printed in the multi-functional peripheral 100 is included. Accordingly, though it not specifically limited, in the embodiment, the information acquiring unit 312 holds dummy image data included and displayed in the preview display as a template for causing the user to more easily understand an output image of the printed matter.

Though the template may be one type, in the embodiment, a plurality of templates, which are appropriately selected corresponding to contents of the print condition included in the preview-display code, are prepared.

For example, the following image data are prepared as templates: the image data where text documents are arranged over a whole printable region; and the image data arranged disproportionately in one direction in a page selected when punch processing or staple processing is specified.

The display unit 314 displays the preview image generated by the preview image generating unit 313. For example, the display of the portable terminal 190 corresponds to this display unit 314. Though it is not specifically limited, in the embodiment, the portable terminal 190 is a smart phone or a tablet terminal, and the display includes a touch panel (operation unit). A user can input an instruction with respect to the portable terminal 190 by operations such as tapping operation, pinching operation, and similar operation with respect to the display of the portable terminal 190.

In the embodiment, the portable terminal 190 further includes a print condition changing unit 315 and a condition-change-code generating unit 316.

The print condition changing unit 315 accepts a change of a print condition. For example, when change-screen display instruction is inputted by a user with respect to the display unit 314 being in a preview display, the print condition changing unit 315 displays a condition change screen on the display unit 314. The user can change a print condition via the condition change screen.

The condition-change-code generating unit 316 codes the new print condition accepted by the print condition changing unit 315 as the print-condition-change code for input to the information processing terminal 180 and displays this print-condition-change code in the display unit 314 of the portable terminal 190.

Though it is not specifically limited, the embodiment employs a character string code as a print-condition-change code. This character string code is configured of characters inputtable by the input unit included in the information processing terminal 180. This character string code is, as described below, inputted to the information processing terminal 180 by a user desiring to change the print condition after reference of the preview display in the portable terminal 190.

In the embodiment, the information included in the print-condition-change code is equivalent information with the print condition included in the preview-display code. That is, the print-condition-change code includes the set values of the print condition of the information identifying the amount of the whole printed matter such as the count of pages and similar information, the information identifying the process in the finisher 160 and similar information. The print-condition-change code may have a configuration including only information on a different set value from the print condition included in the preview code generated in the information processing terminal 180.

The portable terminal 190, similar to the multi-functional peripheral 100 and the information processing terminal 180, includes a CPU, a RAM, a ROM and a flash memory. The CPU, for example, by executing programs (hereinafter referred to as a preview image display program) stored in the ROM or flash memory with the RAM as a work area, ensures the information acquiring unit 312, the preview image generating unit 313, the print condition changing unit 315, and the condition-change-code generating unit 316. As an area where the preview image generating unit 313 or similar unit holds data, for example, the RAM and the flash memory can be used.

As described above, the portable terminal 190 cannot be connected to the network 162 where the information processing terminal 180 and the multi-functional peripheral 100 are connected, but it can communicate via a public communication line. Accordingly, when the above-described preview image display program is open to public on the Internet, the portable terminal 190 can acquire the preview image display program from the Internet connected via the public communication line. Furthermore, the above-described respective function block is ensured on the portable terminal 190 by installation of the preview image display program to the portable terminal 190.

The multi-functional peripheral 100 includes a receiving unit 321. The receiving unit 321 receives the print data transmitted by the transmitting unit 305 of the information processing terminal 180 via the network interface 161. The print data received by the receiving unit 321 is printed in the image forming unit 140.

Figure 4:
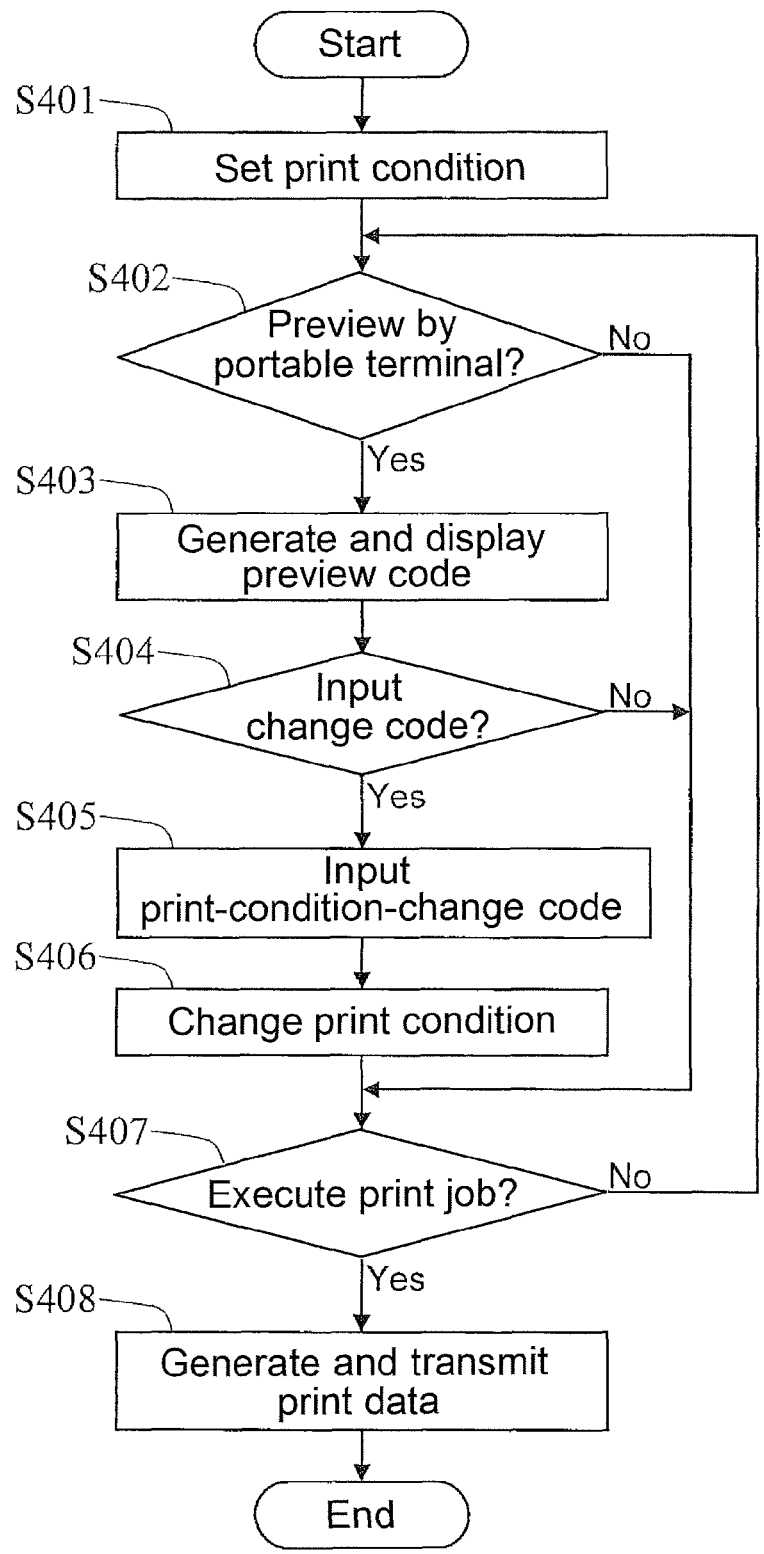
FIG. 4 illustrates an exemplary print data generation procedure performed by the image forming system according to the one embodiment.

FIG. 4 illustrates an exemplary print data generation procedure performed by the image forming system. This procedure starts, for example, with input of the print condition setting instruction by a user in the information processing terminal 180 as a trigger.

In the embodiment, the above-described printer driver has a function of displaying the preview image reflected a print condition settable in the multi-functional peripheral 100 without an optional device mounted. From the aspect of program size reduction or similar reduction, the above-described printer driver does not have a function of displaying the preview image reflected a print condition settable with respect to an optional device such as the finisher 160 or similar unit. In the following example, under these situations, a description will be given of an example that a preview image reflected a print condition settable with respect to an optional device such as the finisher 160 or similar unit is displayed in the portable terminal 190 which a user keeps.

When this procedure starts, the print condition accepting unit 301 displays a print condition input screen on the display unit 303. Then, the print condition accepting unit 301 accepts a setting of the print condition by a user (Step S401). As described above, the user inputs a desired set value with respect to the setting item of the print condition settable corresponding to an optional device and similar device mounted to the multi-functional peripheral 100 via the print condition input screen. Though the setting item of the print condition is not specifically limited, the setting items of the print condition, for example, are: a paper sheet size; the count of print copies; a paper sheet type; print resolution; print quality of a text print, a photograph print, and similar print; a print density; a print layout of a margin, a combined print, and similar layout other than a color mode; image processing relative to image data of a print target; and processing in the finisher 160, such as punch processing, staple processing, and similar setting item.

In the embodiment, the print condition input screen includes a "preview" button and a "portable terminal preview" button. The user selects the "preview" button when the user causes the preview image according to the set print condition to be displayed in the information processing terminal 180. The user selects the "portable terminal preview" button when the user causes the preview image according to the set print condition to be displayed in the portable terminal 190. As described above, the print condition settable with respect to the optional device is not reflected to the preview image displayed in the information processing terminal 180.

In the print condition input screen, when the user select the "portable terminal preview" button, the print condition accepting unit 301 notifies the preview-code generating unit 302 of the selection (Yes at Step S402). The preview-code generating unit 302 corresponds to this notification, acquires the set values of the respective setting items of the print condition, which has already been accepted, from the print condition accepting unit 301, and generates a preview code. Then, the preview-code generating unit 302 displays the generated preview code in the display unit 303 (Step S403).

Figure 5:
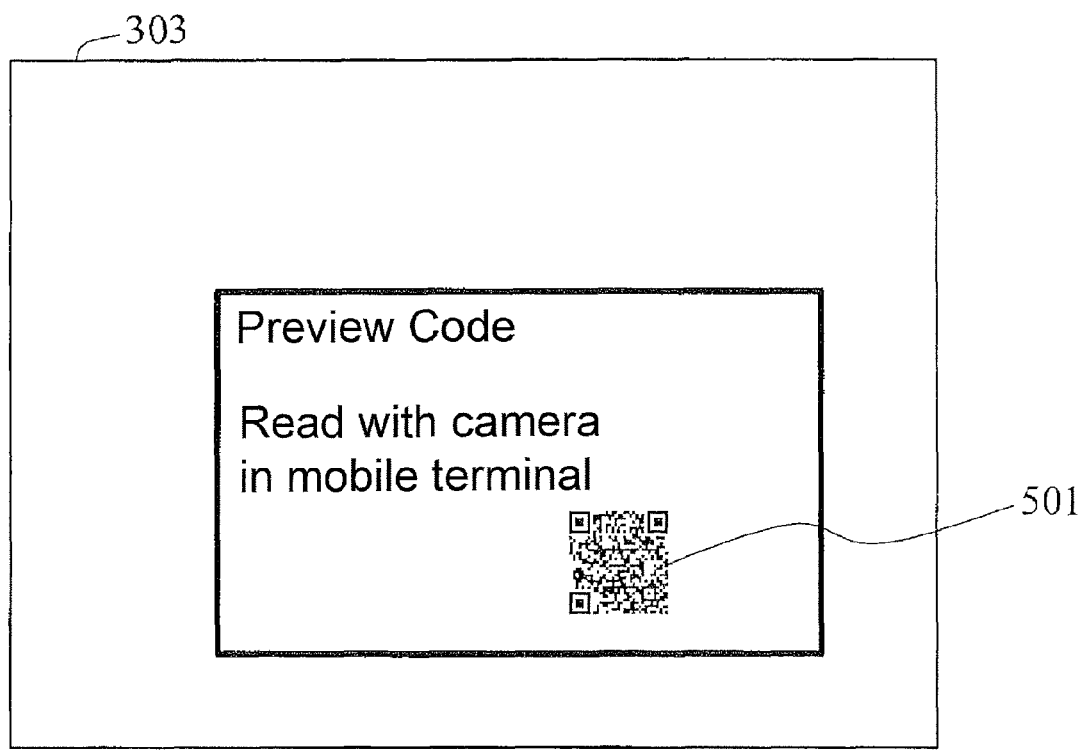
FIG. 5 illustrates an exemplary preview code displayed in the image forming system according to the one embodiment.

FIG. 5 illustrates an exemplary preview code displayed in the display unit 303 at this time. In this example, a preview code 501 is displayed in the display unit 303 together with a message of "read with a camera in a mobile terminal."

The user can acquire necessary information for performance of a preview display of the printed matter in the portable terminal 190 by imaging of the preview code 501 displayed in the display unit 303 with the portable terminal 190 which the user keeps.

Figure 6:
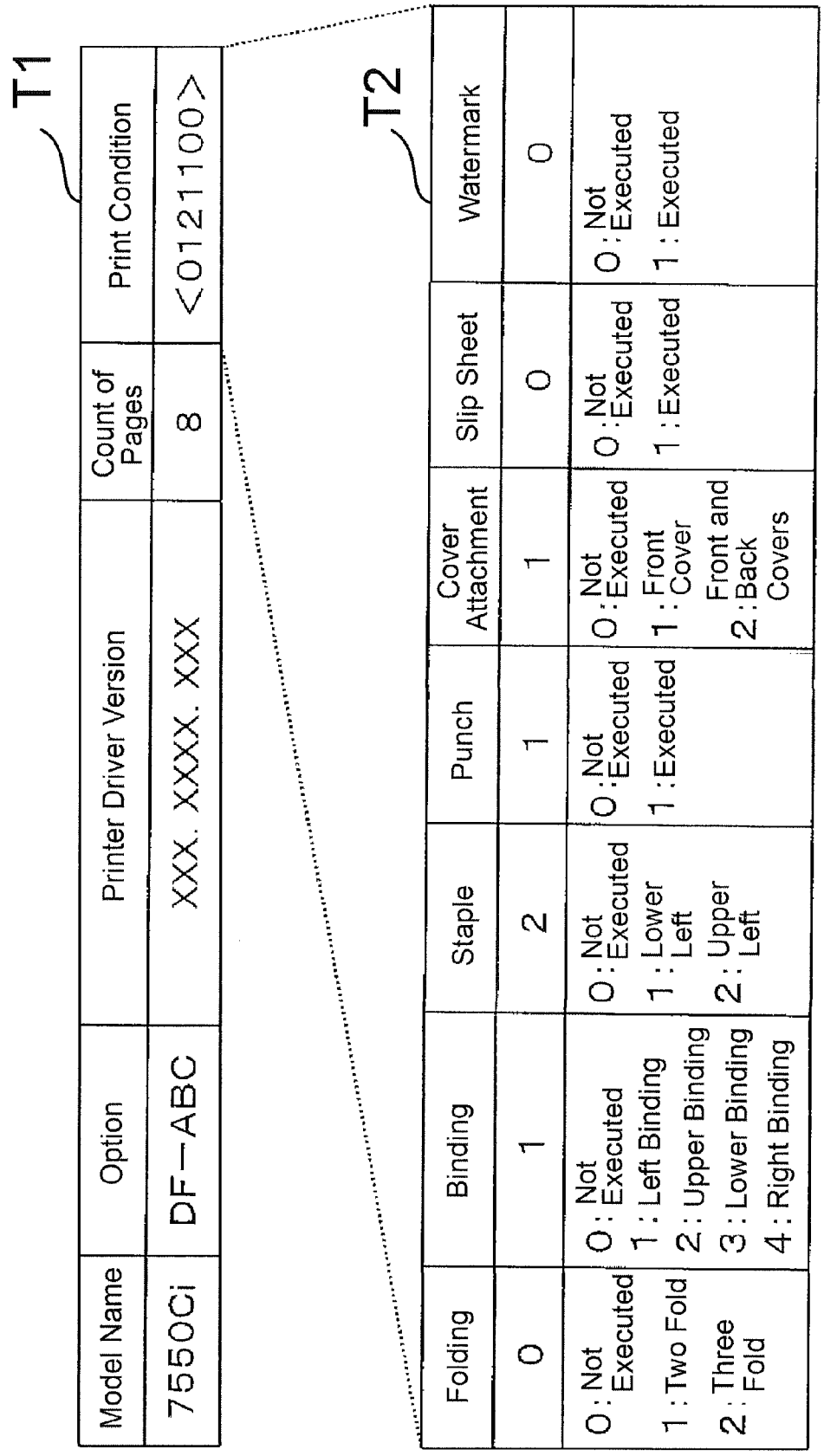
FIG. 6 illustrates an exemplary print condition transmitted and received in the image forming system according to the one embodiment.

FIG. 6 illustrates a piece of exemplary information included in the preview code 501. Information T1 illustrates an exemplary overall configuration of the information included in the preview code 501. Information T2 illustrates a piece of exemplary information on the print condition included in the preview code 501. The print condition in the information T2 is configured by the set values of the setting items changeable in the portable terminal 190.

In the example illustrated in the information T1, the preview code 501 includes the information of a model name, an installed option name, a printer driver version, a count of pages, and the print condition. In the example illustrated in the information T2, as the set values of the setting items changeable in the portable terminal 190, the set values of folding processing, binding processing, staple processing, punch processing, cover attachment processing, slip sheet processing, watermark formation are included. In the lower column of the information T2, set contents, where the set value of the respective setting items indicates, are described. Though the watermark formation is processing not performed in the finisher 160 but performed in the multi-functional peripheral 100, the watermark formation is exemplified as the setting item changeable corresponding to the preview display in the portable terminal 190 here.

In this example, the "print condition" is "<0121100>." This indicates as follows: folding processing: not executed; binding processing: left binding; staple processing: upper left; punch processing: executed; cover attachment processing: cover attached; slip sheet processing: not executed; and watermark formation: not executed.

Figure 7:
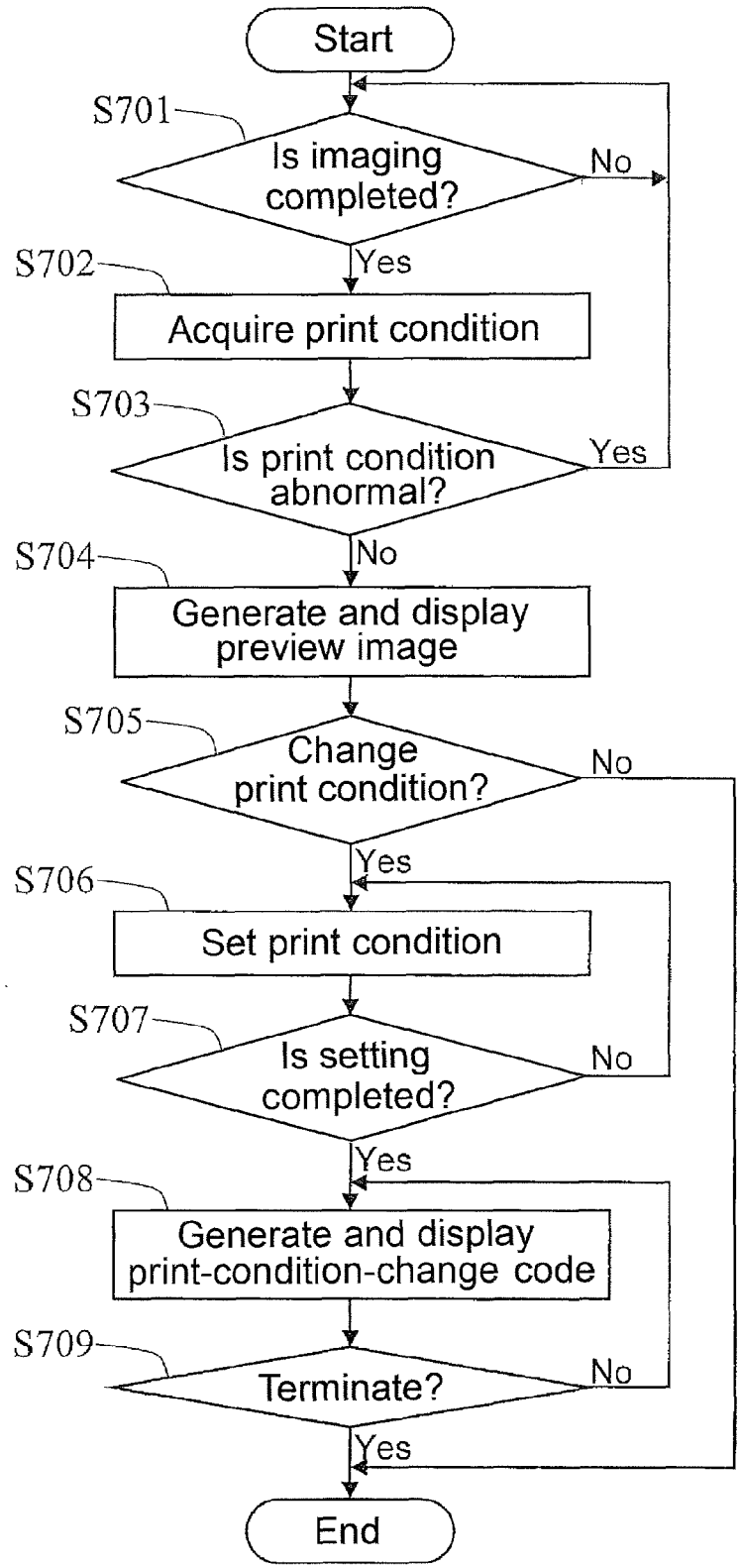
FIG. 7 illustrates an exemplary print condition changing procedure performed by the image forming system according to the one embodiment.

Here, a description will be given of acquisition of the preview code by the portable terminal 190. FIG. 7 illustrates an exemplary print condition changing procedure performed by the image forming system 10.

This procedure proceeds by user's imaging of the preview code displayed in the information processing terminal 180 with the portable terminal 190 as the trigger (No at Step S701, Yes at Step S701).

The imaging unit 311 of the portable terminal 190 having imaged the preview code generates the image data of the preview code and input to the information acquiring unit 312. The information acquiring unit 312 corresponds to the input, decodes the preview code, and acquires the information (print condition) included in the preview code (Step S702). At this time, when the information cannot be normally acquired, the information acquiring unit 312 requests the user to image the preview code again (Yes at Step S703). This request can be performed, for example, by display of the request message in the display unit 314.

When the information is normally acquired, the information acquiring unit 312 inputs the acquired information to the preview image generating unit 313. The preview image generating unit 313, based on the inputted information, generates the preview image by the above-described method. The preview image generating unit 313 displays the generated preview image in the display unit 314 of the portable terminal 190 (Step S704).

As described above, the display unit 314 is configured with a touch panel display. Therefore, the user can perform enlarged display, reduced display, and similar display of the preview image displayed in the display unit 314 by performance of pinch-in operation, pinch-out operation, and similar operation with respect to the display unit 314.

when the user having confirmed the preview image desires to change the print condition, as described above, the user inputs the change-screen display instruction with respect to the display unit 314 displaying the preview display. The print condition changing unit 315 displays the condition change screen in the display unit 314 corresponding to the input (Yes at Step S705, Step S706, No at Step S707). Though it is not specifically limited, in the embodiment, the user can change the set value relate to the print condition included in the preview code.

When the setting (change) of the print condition by the user is completed, the print condition changing unit 315 notifies the condition-change-code generating unit 316 of the completion of the setting (change) of the print condition (Yes at Step S707). The condition-change-code generating unit 316 corresponding to this notification generates a print-condition-change code based on the new print condition accepted by the print condition changing unit 315. The condition-change-code generating unit 316 displays the generated print-condition-change code in the display unit 314 (Step S708, No at Step S709).

Figure 8:
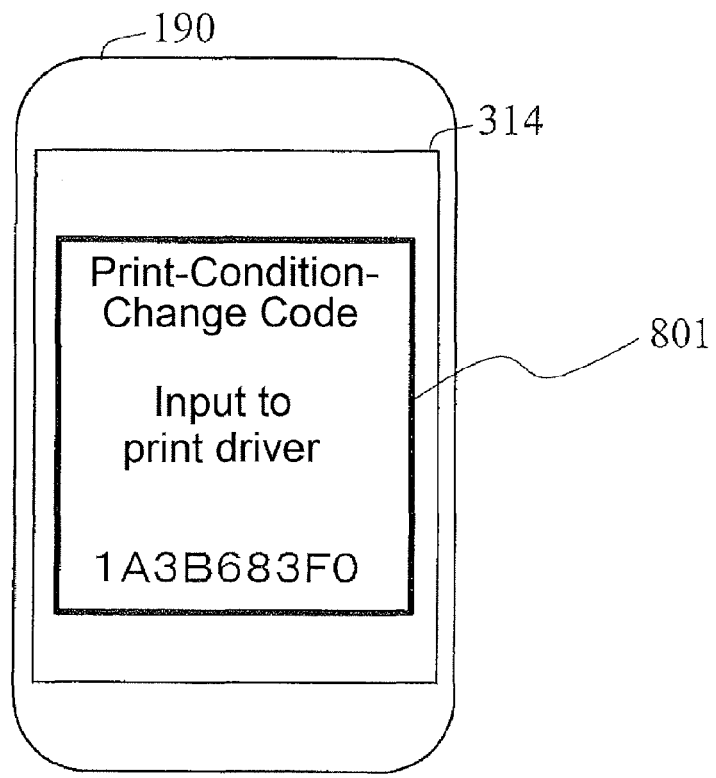
FIG. 8 illustrates an exemplary print-condition-change code displayed in the image forming system according to the one embodiment.

FIG. 8 illustrates an exemplary print-condition-change code displayed in the display unit 314 at this time. In this example, a print-condition-change code 801 is displayed in the display unit 314 together with a message "Input in the printer driver."

The user can reflect the print condition changed in the portable terminal 190 to the information processing terminal 180 by input of the print-condition-change code displayed in the display unit 314 to the information processing terminal 180 where preview-code is generated.

When the user having verified the print-condition-change code, for example, performs double-tapping in the display unit 314, the procedure terminates (Yes at Step S709). When the user having verified the preview image does not desire a change of the print condition, the procedure terminates, for example, when the user performs double-tapping in the display unit 314 (No at Step S705).

Figure 9:
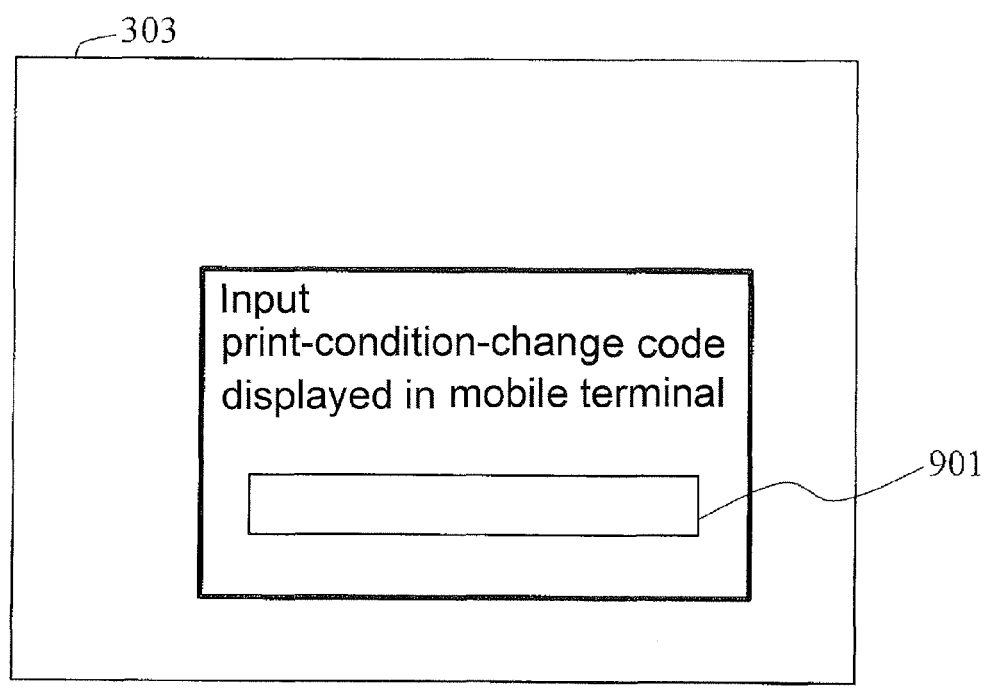
FIG. 9 illustrates an exemplary input screen of the print-condition-change code displayed in the image forming system according to the one embodiment.

As described above, when the user acquires print-condition-change code, the user inputs input screen display instruction to the information processing terminal 180. The change-code accepting unit 306 corresponding to the input of this instruction displays the input screen in the display unit 303 (Yes at Step S404). FIG. 9 illustrates an exemplary input screen of the print-condition-change code displayed in the display unit 303 at this time. In this example, a print-condition-change code input field 901 is displayed in the display unit 303 together with a message of "Input the print-condition-change code displayed in the mobile terminal."

When the user input the print-condition-change code via this input screen, the change-code accepting unit 306 inputs the inputted print-condition-change code to the changed print-condition acquiring unit 307 (Step S405). The changed print-condition acquiring unit 307 corresponding to this input decodes the print-condition-change code, and acquires the information (print condition) included in the print-condition-change code. Then the changed print-condition acquiring unit 307 inputs the acquired information into the print condition accepting unit 301. The print condition accepting unit 301 corresponding to this input changes the print condition (Step S406).

When the user inputs a print execution instruction with respect to the information processing terminal 180 via the print condition input screen, this instruction is accepted by the print condition accepting unit 301 (Yes at Step S407). The print-data generating unit 304 generates print data in accordance with the print condition accepted by the print condition accepting unit 301 and inputs the generated print data to the transmitting unit 305. At this time, the transmitting unit 305 transmits the inputted print data to the multi-functional peripheral 100 (Step S408).

On the other hand, when the user desires to perform the preview display in the portable terminal 190 again, the user may select the "portable terminal preview" button in the print condition input screen without input of the print execution instruction (No at Step S407).

When a user, who have not needed the preview display in the portable terminal 190, desires the preview display in the portable terminal 190, this user may select the "portable terminal preview" button in the print condition input screen without input of the print execution instruction (No at Step S402, No at Step S407). Similarly, when a user, who has not needed the input of the print-condition-change code, desires the preview display in the portable terminal 190, this user may select the "portable terminal preview" button in the print condition input screen without input of the print execution instruction (No at Step S404, No at Step S407).

As described above, in the image forming system 10, necessary information for the preview display can be acquired from the information processing terminal 180 without connecting the portable terminal 190 to the network 162. That is, without reducing security, the preview display is ensured in the portable terminal 190. Accordingly, as the embodiment described above, the following configuration is ensured: the information processing terminal 180 incorporates the printer driver where a relatively complicated preview display function relate to an optional device mounted to the multi-functional peripheral 100 is omitted, and the portable terminal 190 perform the preview display relate to this optional device. Therefore, even in a situation that the information processing terminal 180 incorporates the printer driver where the relatively complicated preview display function relate to an optional device mounted to the multi-functional peripheral 100 is omitted, the user can verify the relatively complicated preview display, and it can be prevented that an unintended printed matter is printed to wastefully consume paper sheets and similar object.

In the image forming system 10, with the portable terminal 190 in the preview display, the print condition can be changed during reference of the preview display, and also this changed print condition can be set to the information processing terminal 180. Furthermore, in the image forming system 10, because transmitting and receiving the print data (Alternatively, thumbnail of the print data) is not performed, it is significantly easier to code the preview code in the information processing terminal and to decode the preview code in the portable terminal.

In the above-described embodiment, as especially preferable configuration, it is configured that the portable terminal 190 includes the print condition changing unit 315 and the condition-change-code generating unit 316, and the information processing terminal 180 includes the change-code accepting unit 306 and the changed print-condition acquiring unit 307. However, these components are selective components and not necessary components for the disclosure. Even a configuration without these components included ensures that the portable terminal 190 can acquire necessary information for the preview display from the information processing terminal 180 without connection of the portable terminal 190 to the network 162 and can perform the preview display in the portable terminal 190 without reduction of security. In this case, while referring to the preview display displayed in the portable terminal 190, the user can change the print condition in the print condition input screen of the information processing terminal 180.

The preview-display code is not required to be a two-dimensional code, and any code, which the portable terminal 190 can acquire by imaging, can be used. Similarly, the print-condition-change code is not required to be a character string code, any code, which can be inputted to the information processing terminal 180 not via the network 162, can be used.

Furthermore, in the above-described embodiment, though the preview code is configured not to include image data, it is not excluded that the preview code includes image data.

According to the disclosure, it is not necessary to sophisticate the preview display function of the information processing terminal, and the relatively complicated preview display is ensured with use of a portable terminal which a user keeps without reduction of security, which is effective as an image forming system and an information processing terminal.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming system comprising:
    a portable terminal having an imaging function;
    an information processing terminal that generates print data; and
    an image forming apparatus that generates a printed matter based on the print data received from the information processing terminal,
    wherein the information processing terminal includes:
        a print condition accepting unit that accepts an input of a print condition;
        a preview-code generating unit that codes information necessary for a preview display of the printed matter according to the print condition accepted by the print condition accepting unit as a preview-display code when a preview display instruction is inputted in the portable terminal;
        a display unit that displays the preview-display code generated by the preview-code generating unit;
        a print-data generating unit that generates the print data according to the print condition accepted by the print condition accepting unit when a print execution instruction is inputted; and
        a transmitting unit that transmits the print data generated by the print-data generating unit to the image forming apparatus,
    wherein the portable terminal includes:
        an imaging unit that images the preview-display code displayed in the display unit of the information processing terminal;
        an information acquiring unit that acquires information necessary for the preview display based on the preview-display code acquired by the imaging unit;
        a preview image generating unit that generates a preview image of the printed matter according to the information acquired by the information acquiring unit; and
        a display unit that displays the preview image generated by the preview image generating unit,
    wherein the image forming apparatus includes:
        a receiving unit that receives the print data transmitted by the transmitting unit of the information processing terminal; and an image forming unit that prints the print data received by the receiving unit.

2. The image forming system according to claim 1, wherein the portable terminal further includes:
   a print condition changing unit that accepts a change of the print condition; and
   a condition-change-code generating unit that codes a new print condition accepted by the print condition changing unit as a print-condition-change code for inputting into the information processing terminal to display the print-condition-change code in the display unit of the portable terminal, and the information processing terminal further includes:
   a change-code accepting unit that accepts an input of the print-condition-change code; and
   a changed print-condition acquiring unit that acquires the print condition from the print-condition-change code accepted by the change-code accepting unit to input the print condition into the print condition accepting unit.

3. The image forming system according to claim 1, wherein the preview-code generating unit codes a set value of the print condition necessary for the preview display as the preview-display code.

4. The image forming system according to claim 3, wherein the preview-display code generated by the preview-code generating unit is a two-dimensional code.

5. The image forming system according to claim 2, wherein the print-condition-change code generated by the condition-change-code generating unit is a character string code.

6. An information processing terminal for connection to an image forming apparatus and generating print data for generation of a printed matter in the image forming apparatus, the information processing terminal, comprising:
   a print condition accepting unit that accepts an input of a print condition;
   a preview-code generating unit that codes information necessary for a preview display of the printed matter according to the print condition accepted by the print condition accepting unit as a preview-display code imageable by a portable terminal when a preview display instruction is inputted in the portable terminal;
   a display unit that displays the preview-display code generated by the preview-code generating unit;
   a print-data generating unit that generates the print data according to the print condition accepted by the print condition accepting unit when a print execution instruction is inputted in the portable terminal; and
   a transmitting unit that transmits the print data generated by the print-data generating unit to the image forming apparatus.

* * * * *